United States Patent
Ma

(10) Patent No.: US 9,299,159 B2
(45) Date of Patent: Mar. 29, 2016

(54) SYSTEMS AND METHODS FOR TRACKING OBJECTS

(71) Applicant: Cyberlink Corp., Shindian, Taipei (TW)

(72) Inventor: Chih-Chao Ma, Taichung (TW)

(73) Assignee: CYBERLINK CORP., Taipei (TW)

( * ) Notice: Subject to any disclaimer, the term of this patent is extended or adjusted under 35 U.S.C. 154(b) by 206 days.

(21) Appl. No.: 14/071,899

(22) Filed: Nov. 5, 2013

(65) Prior Publication Data

US 2014/0133701 A1　May 15, 2014

Related U.S. Application Data

(60) Provisional application No. 61/724,389, filed on Nov. 9, 2012.

(51) Int. Cl.
　　*G06K 9/00*　　(2006.01)
　　*G06T 7/20*　　(2006.01)

(52) U.S. Cl.
　　CPC .................................. *G06T 7/2033* (2013.01)

(58) Field of Classification Search
　　None
　　See application file for complete search history.

(56) References Cited

U.S. PATENT DOCUMENTS

| | | | |
|---|---|---|---|
| 5,940,538 A | 8/1999 | Spiegel et al. | |
| 7,142,600 B1 | 11/2006 | Schonfeld et al. | |
| 7,164,718 B2 | 1/2007 | Maziere et al. | |
| 2009/0324012 A1* | 12/2009 | Sun et al. | 382/103 |
| 2010/0158378 A1* | 6/2010 | Wu et al. | 382/190 |
| 2011/0291925 A1* | 12/2011 | Israel et al. | 345/157 |

OTHER PUBLICATIONS

Chiueh et al. "Zodiac: A history-based interactive video authoring system" Multimedia Systems 8: 201-211 (2000).
Singh et al. "Annotation Supported Contour Based Object Tracking with Frame Based Error Analysis" 2011 3rd International Conference on Machine Learning and Computing (ICMLC 2011).
Daras et al. "MPEG-4 Authoring Tool Using Moving Object Segmentation and Tracking in Video Shots" EURASIP Journal on Applied Signal Processing 2003:9, 861-877, Nov. 22, 2002.

* cited by examiner

*Primary Examiner* — Weiwen Yang
(74) *Attorney, Agent, or Firm* — McClure, Qualey & Rodack, LLP

(57) ABSTRACT

Various embodiments are disclosed for performing object tracking. One embodiment is a method for tracking an object in a plurality of frames, comprising obtaining a reference contour of an object in a reference frame and estimating, for a current frame after the reference frame, a contour of the object. The method further comprises comparing the reference contour with the estimated contour and determining at least one local region of the reference contour in the reference frame based on a difference between the reference contour and the estimated contour. Based on the difference, at least one corresponding region of the current frame is determined. The method further comprises computing a degree of similarity between the at least one corresponding region in the current frame and the at least one local region in the reference frame, adjusting the estimated contour in the current frame according to the degree of similarity, and designating the current frame as a new reference frame and a frame after the new reference as a new current frame.

33 Claims, 16 Drawing Sheets
(1 of 16 Drawing Sheet(s) Filed in Color)

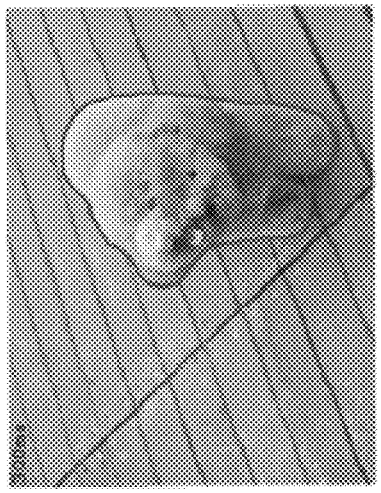
FIG. 7A
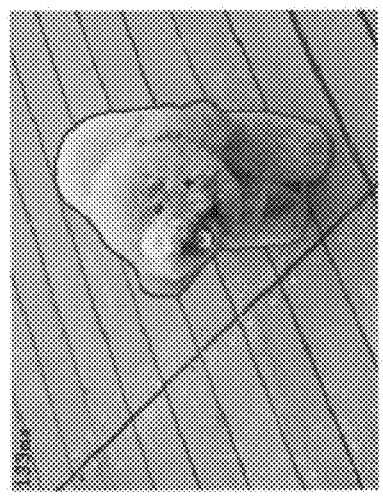
FIG. 7B
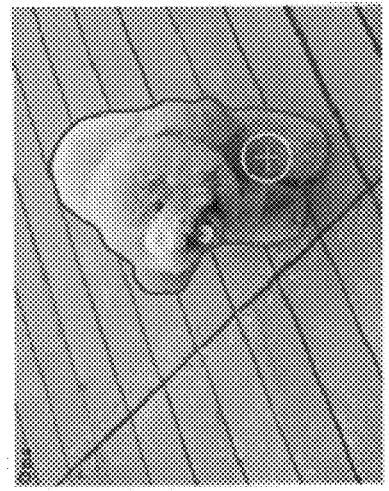
FIG. 7C
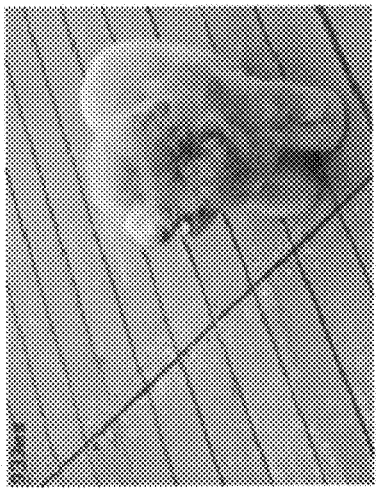
FIG. 7D
FIG. 7E
FIG. 7F

SYSTEMS AND METHODS FOR TRACKING OBJECTS

CROSS-REFERENCE TO RELATED APPLICATION

This application claims priority to, and the benefit of, U.S. Provisional Patent Application entitled, "Systems and Methods for Tracking Objects," having Ser. No. 61/724,389, filed on Nov. 9, 2012, which is incorporated by reference in its entirety.

TECHNICAL FIELD

The present disclosure generally relates to video processing, and more particularly, to a system and method for tracking objects utilizing a contour weighting map.

BACKGROUND

Over the years, digital content has gained increasing popularity with consumers. With the ever-growing amount of digital content available to consumers through the Internet using computers, smart phones, and other sources, consumers have access to a vast amount of content. Furthermore, many devices (e.g., smartphones) and services are readily available that allow consumers to capture and generate video content.

Upon capturing or downloading video content, the process of tracking objects is commonly performed for editing purposes. For example, a user may wish to augment a video with special effects where one or more graphics are superimposed onto an object. In this regard, precise tracking of the object is important. However, challenges may arise when tracking objects, particularly as the object moves from frame to frame. This may cause, for example, the object to vary in shape and size. Additional challenges may arise when the object includes regions or elements that easily blend in with the background. This may be due to the thickness of the elements, the color make-up of the elements, and/or other attributes of the elements.

SUMMARY

Briefly described, one embodiment, among others, is a method for tracking an object in a plurality of frames, comprising obtaining a reference contour of an object in a reference frame and estimating, for a current frame after the reference frame, a contour of the object. The method further comprises comparing the reference contour with the estimated contour and determining at least one local region of the reference contour in the reference frame based on a difference between the reference contour and the estimated contour. Based on the difference, at least one corresponding region of the current frame is determined. The method further comprises computing a degree of similarity between the at least one corresponding region in the current frame and the at least one local region in the reference frame, adjusting the estimated contour in the current frame according to the degree of similarity, and designating the current frame as a new reference frame and a frame after the new reference as a new current frame.

Another embodiment is a system for tracking an object in a plurality of frames, comprising a processing device. The system further comprises an object selector executable in the processing device for obtaining a reference contour of an object in a reference frame and a contour estimator executable in the processing device for estimating, for a current frame after the reference frame, a contour of the object. The system further comprises a local region analyzer executable in the processing device for: comparing the reference contour with the estimated contour, determining at least one local region of the reference contour in the reference frame based on a difference between the reference contour and the estimated contour, determining at least one corresponding region of the current frame based on the difference, and computing a degree of similarity between the at least one corresponding region in the current frame and the at least one local region in the reference frame. The contour estimator adjusts the estimated contour in the current frame according to the degree of similarity and designates the current frame as a new reference frame and a frame after the new reference as a new current frame.

Another embodiment is a non-transitory computer-readable medium embodying a program executable in a computing device, comprising code that generates a user interface and obtains a reference contour of an object in a reference frame, code that estimates, for a current frame after the reference frame, a contour of the object, code that compares the reference contour with the estimated contour and code that determines at least one local region of the reference contour in the reference frame based on a difference between the reference contour and the estimated contour. The program further comprises code that determines at least one corresponding region of the current frame based on the difference, code that computes a degree of similarity between the at least one corresponding region in the current frame and the at least one local region in the reference frame, code that adjusts the estimated contour in the current frame according to the degree of similarity, and code that designates the current frame as a new reference frame and a frame after the new reference as a new current frame.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The patent or application file contains at least one drawing executed in color. Copies of this patent or patent application publication with color drawings will be provided by the Office upon request and payment of the necessary fee.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 7A illustrates selection of an object by a user using a selection tool in a first frame.

FIGS. 7B-7E illustrate the object in succeeding frames.

FIG. 7F illustrates modification of the object based on the estimated contour.

DETAILED DESCRIPTION

Figure 1:
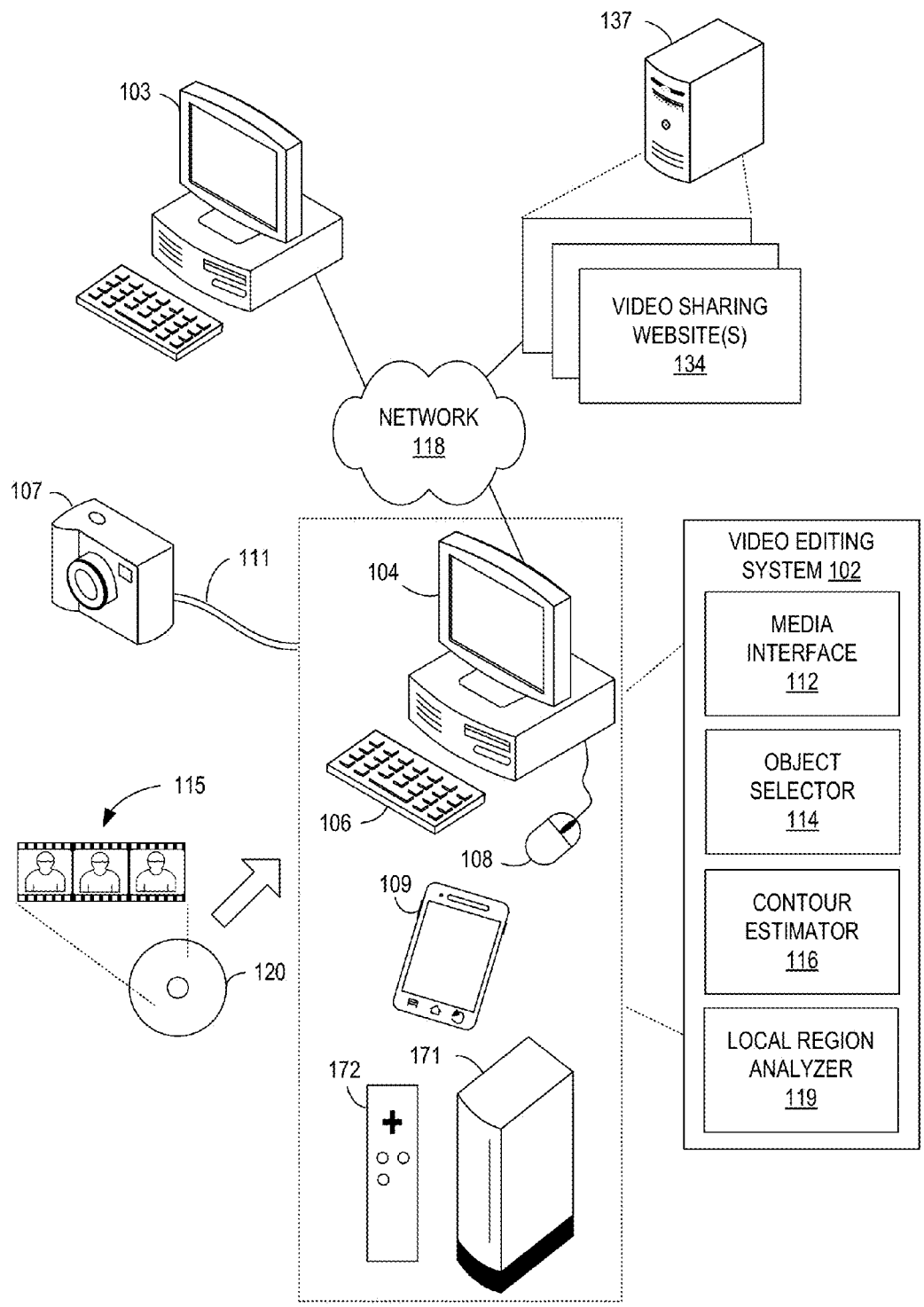
FIG. 1 is a block diagram of a video editing system for facilitating object tracking in accordance with various embodiments of the present disclosure.

The process of tracking one or more objects within a video stream may be challenging, particularly when the object moves from frame to frame as the object may vary in shape and size when moving from one position/location to another. Additional challenges may arise when the object includes regions or elements that tend to blend in with the background. In order to produce high quality video editing results, an object tracking system should accurately estimate the contour of the object as the object moves. However, the object tracking process may occasionally yield erroneous results. For example, in some cases, one or more portions of the object being tracked will not be completely surrounded by the estimated contour that corresponds to an estimation of where and how the object is positioned. As temporal dependency exists in the object tracking process, an erroneous tracking result will, in many cases, lead to a series of erroneous results, thereby affecting video editing process that follows.

In some cases, the user can reduce the number of erroneous results by manually refining the estimated contour on a frame-by-frame basis as needed and then allowing the tracking system to resume object tracking based on the refinements made by the user. However, if a portion of the object is difficult to track due to its color, shape, contour, or other attributes, the object tracking algorithm may continually yield erroneous results for the portions of the object that are difficult to track. This results in the user having to constantly refine the tracking results in order to produce an accurate, estimated contour of the object. This, of course, can be a time consuming process.

Various embodiments are disclosed for improving the tracking of objects within an input stream of frames, particularly for objects that include elements or regions that may be difficult to track by conventional systems due to color, shape, contour, and other attributes. For some embodiments, the position and contour of the object is estimated on a frame-by-frame basis. The user selects a frame in the video and manually specifies the contour of an object in the frame. As described in more detail below, for the video frames that follow, the object tracking system iteratively performs a series of operations that include refining estimated contours based on the contour in a previous frame.

First, an object contour in the current video frame is received from the user and designated as a reference contour. An object tracking algorithm is then utilized to estimate the object contour in the next video frame, and a tracking result is generated whereby an estimated contour is derived. The object tracking system compares the generated tracking result with the recorded reference contour, and a "local region" corresponding to a region containing the difference in contour between the two is derived. Based on the content of the local region in the current video frame and the content of the local region in the next video frame, the object tracking system computes the similarity of the corresponding local regions between the two video frames, and refines the tracking result (i.e., the estimated contour) of the next frame according to the degree of similarity. The iterative tracking process continues until all the frames are processed or until the user stops the tracking process.

A description of a system for facilitating object tracking is now described followed by a discussion of the operation of the components within the system. FIG. 1 is a block diagram of a video editing system 102 in which embodiments of the object tracking techniques disclosed herein may be implemented. The video editing system 102 may be embodied, for example, as a desktop computer, computer workstation, laptop, a smartphone 109, a tablet, or other computing platform that includes a display 104 and may include such input devices as a keyboard 106 and a mouse 108.

For embodiments where the video editing system 102 is embodied as a smartphone 109 or tablet, the user may interface with the video editing system 102 via a touchscreen interface (not shown). In other embodiments, the video editing system 102 may be embodied as a video gaming console 171, which includes a video game controller 172 for receiving user preferences. For such embodiments, the video gaming console 171 may be connected to a television (not shown) or other display 104.

The video editing system 102 is configured to retrieve, via the media interface 112, digital media content 115 stored on a storage medium 120 such as, by way of example and without limitation, a compact disc (CD) or a universal serial bus (USB) flash drive, wherein the digital media content 115 may then be stored locally on a hard drive of the video editing system 102. As one of ordinary skill will appreciate, the digital media content 115 may be encoded in any of a number of formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), or any number of other digital formats.

As depicted in FIG. 1, the media interface 112 in the video editing system 102 may also be configured to retrieve digital media content 115 directly from a digital camera 107 where a cable 111 or some other interface may be used for coupling the digital camera 107 to the video editing system 102. The video editing system 102 may support any one of a number of common computer interfaces, such as, but not limited to IEEE-1394 High Performance Serial Bus (Firewire), USB, a serial connection, and a parallel connection.

The digital camera 107 may also be coupled to the video editing system 102 over a wireless connection or other communication path. The video editing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the video editing system 102 may receive digital media content 115 from another computing system 103. Alternatively, the video editing system 102 may access one or more video sharing websites 134 hosted on a server 137 via the network 118 to retrieve digital media content 115.

The object selector 114 in the video editing system 102 is configured to obtain an object contour selection from the user of the video editing system 102, where the user is viewing and/or editing the media content 115 obtained by the media interface 112. For some embodiments, the objection selection is used as a reference contour where a local region is derived for purposes of refining subsequent contour estimations, as described in more detail below.

Figure 4:
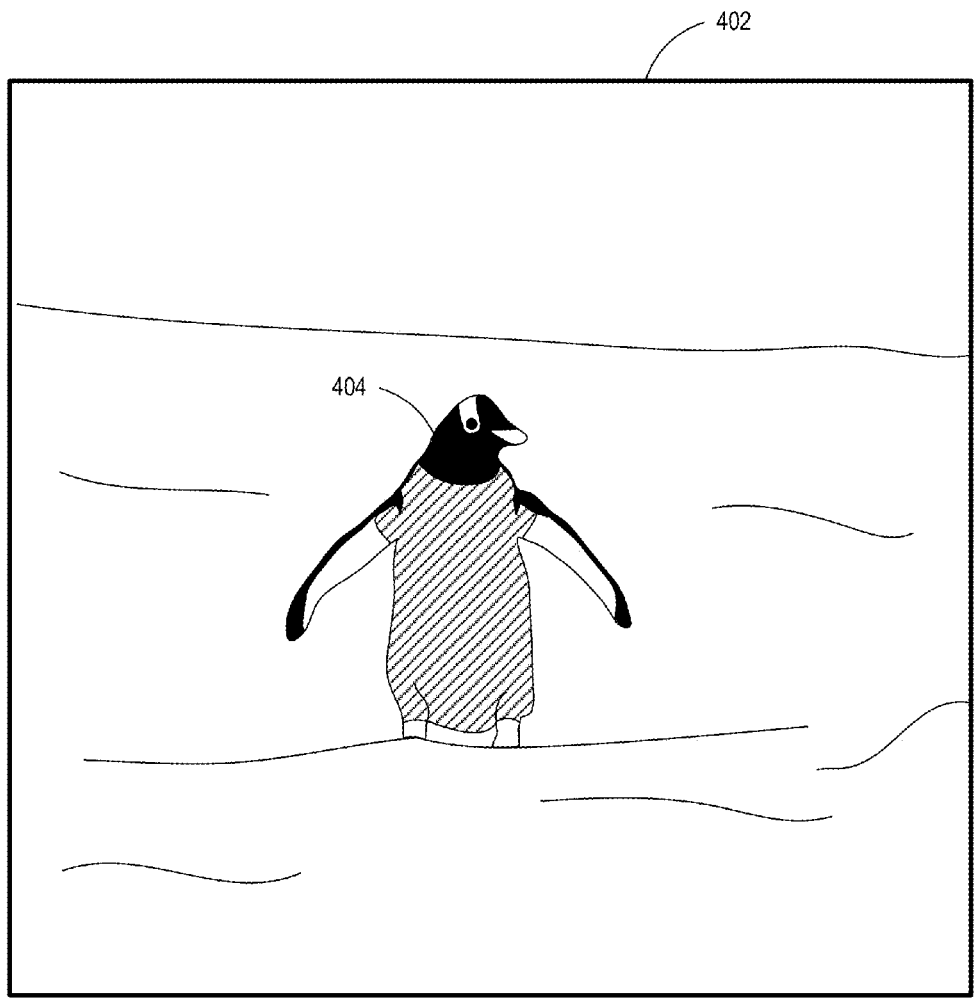
FIG. 4 depicts an example digital image to be processed by the video editing system of FIG. 1 in accordance with various embodiments of the present disclosure.

The contour estimator 116 is configured to estimate a contour on a frame-by-frame basis for the object being tracked. The local region analyzer 119 determines a local region based on a difference between the reference contour and the estimated contour. As referred to herein, a "local region" generally refers to one or more areas or regions within a given frame corresponding to a portion or element of an object that is lost or erroneously added during the tracking process. To further illustrate the concept of a local region, reference is made briefly to FIGS. 4-6, where FIG. 4 depicts an object 404 (i.e., a penguin) that a user wishes to track. As shown, the object 404 includes various elements (e.g., the flippers) which vary in size, shape, color, etc.

Figure 5:
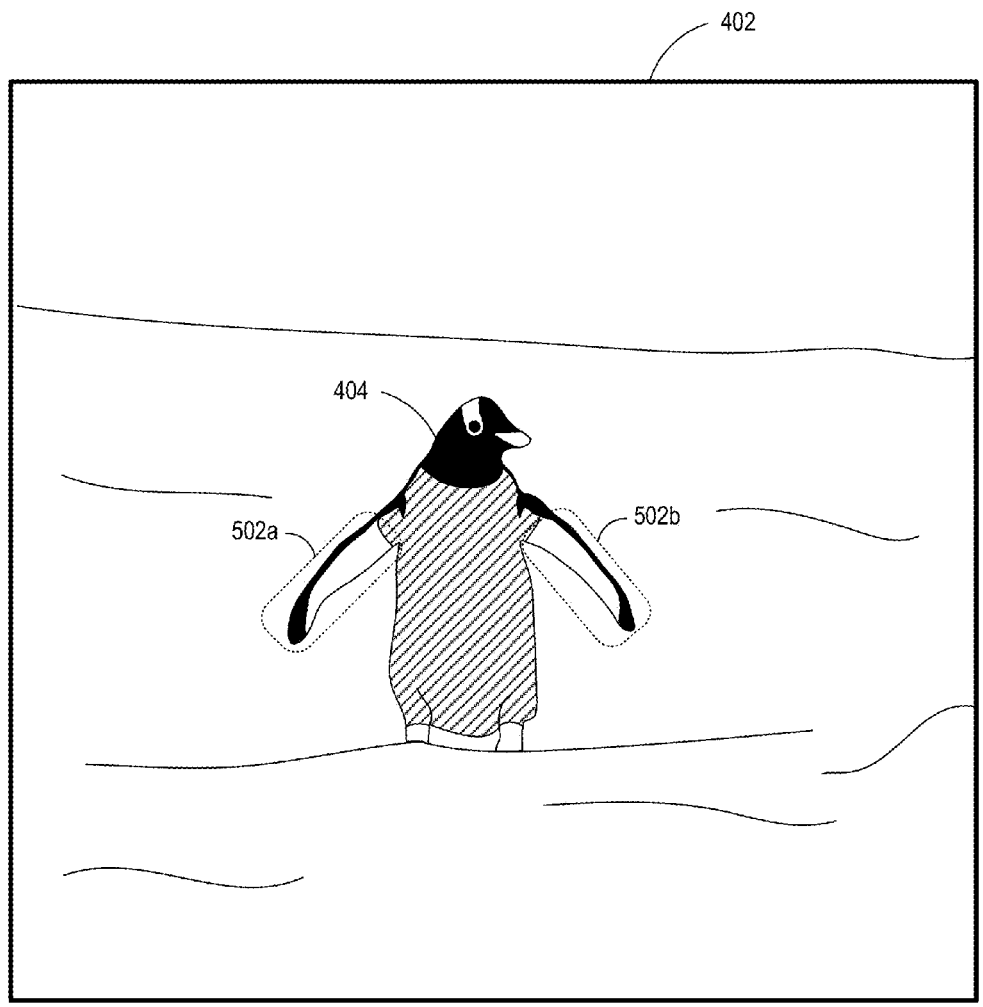
FIG. 5 illustrates thin regions of an object to be tracked by the video editing system of FIG. 1 in accordance with various embodiments of the present disclosure.
Figure 6:
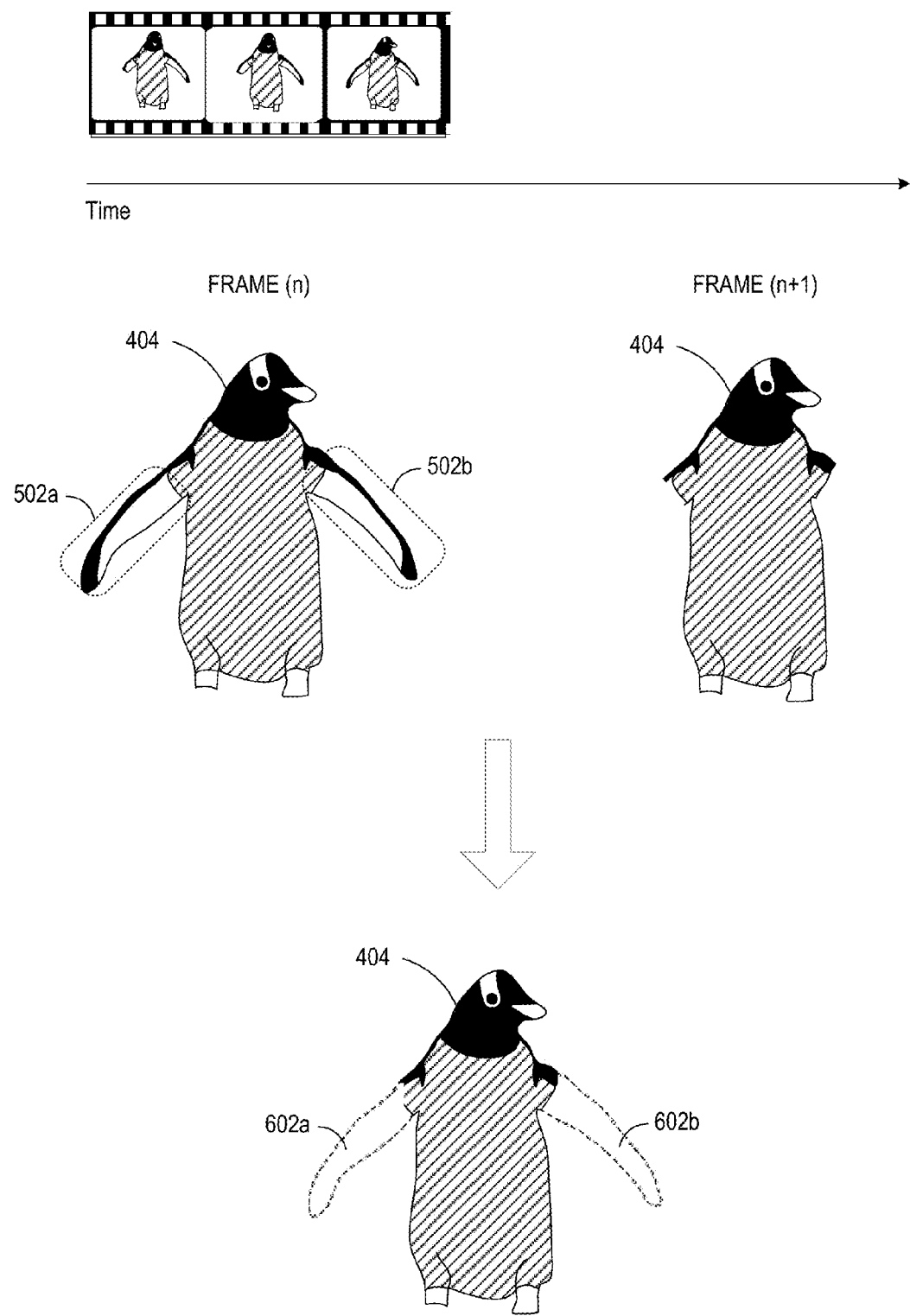
FIG. 6 illustrates the identification of local regions by the video editing system of FIG. 1 in accordance with various embodiments of the present disclosure.

As shown in FIG. 5, the object 404 includes various elements or regions that blend in with the background, thereby resulting in "thin" regions 502a, 502b due to the thin portions of the elements that are in contrast with the background of the image in the frame 402. As further illustrated in FIG. 6, the local regions 602a, 602b identified by the local region analyzer 119 comprises the portion of the object that is lost (i.e., the flippers) during the tracking process. As described in more detail below, these local regions 602a, 602b are analyzed across frames to further refine or correct the contour estimation derived by the contour estimator 116. In some cases, the local regions 602a, 602b are added to an estimated contour in order to more accurately track the object 404.

Figure 2:
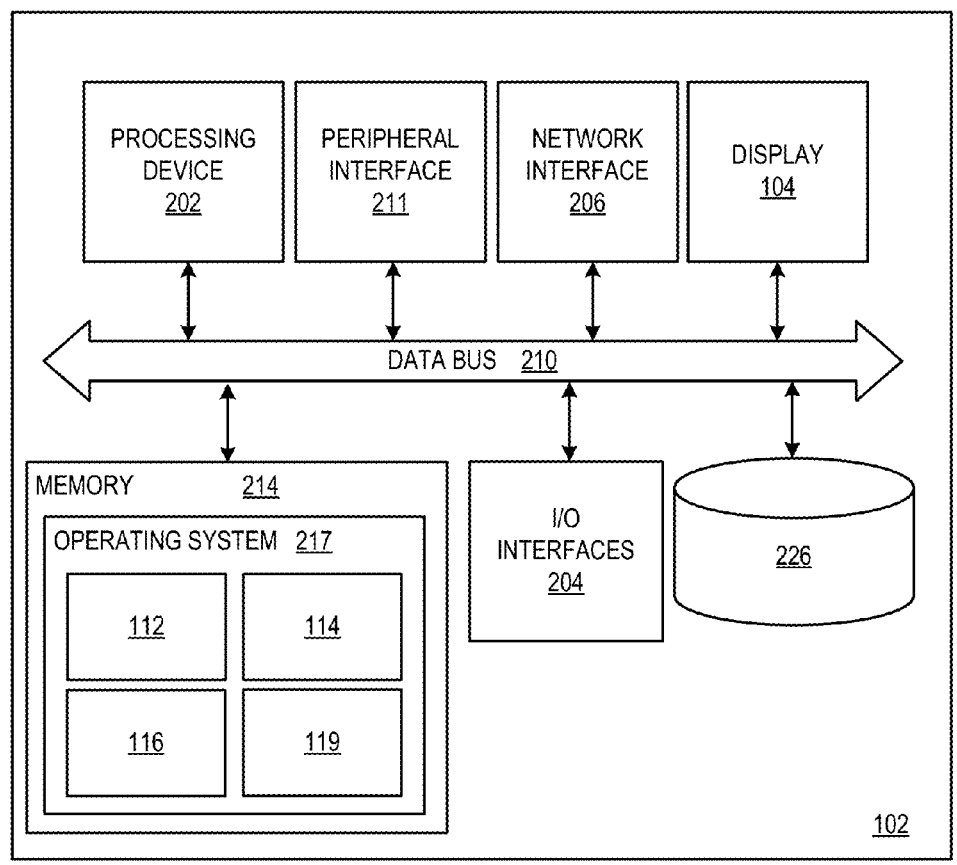
FIG. 2 is a detailed view of the video editing system device of FIG. 1 in accordance with various embodiments of the present disclosure.

Turning now to FIG. 2, shown is a schematic diagram of the video editing system 102 shown in FIG. 1. The video editing system 102 may be embodied in any one of a wide variety of wired and/or wireless computing devices, such as a desktop computer, portable computer, dedicated server computer, multiprocessor computing device, smartphone 109 (FIG. 1), tablet computing device, and so forth. As shown in FIG. 2, the video editing system 102 comprises memory 214, a processing device 202, a number of input/output interfaces 204, a network interface 206, a display 104, a peripheral interface 211, and mass storage 226, wherein each of these devices are connected across a local data bus 210.

The processing device 202 may include any custom made or commercially available processor, a central processing unit (CPU) or an auxiliary processor among several processors associated with the video editing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 217, one or more native applications, emulation systems, or emulated applications for any of a variety of operating systems and/or emulated hardware platforms, emulated operating systems, etc.

The applications may include application specific software which may comprise some or all the components (media interface 112, object selector 114, contour estimator 116, local region analyzer 119) of the video editing system 102 depicted in FIG. 1. In accordance with such embodiments, the components are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the video editing system 102 comprises a personal computer, these components may interface with one or more user input devices via the I/O interfaces 204, where the user input devices may comprise a keyboard 106 (FIG. 1) or a mouse 108 (FIG. 1). The display 104 may comprise a computer monitor, a plasma screen for a PC, a liquid crystal display (LCD), a touchscreen display, or other display device 104.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 2, network interface 206 comprises various components used to transmit and/or receive data over a network environment. For example, the network interface 206 may include a device that can communicate with both inputs and outputs, for instance, a modulator/demodulator (e.g., a modem), wireless (e.g., radio frequency (RF)) transceiver, a telephonic interface, a bridge, a router, network card, etc.). The video editing system 102 may communicate with one or more computing devices via the network interface 206 over the network 118 (FIG. 1). The video editing system 102 may further comprise mass storage 226. The peripheral interface 211 supports various interfaces including, but not limited to IEEE-1294 High Performance Serial Bus (Firewire), USB, a serial connection, and a parallel connection.

Figure 3:
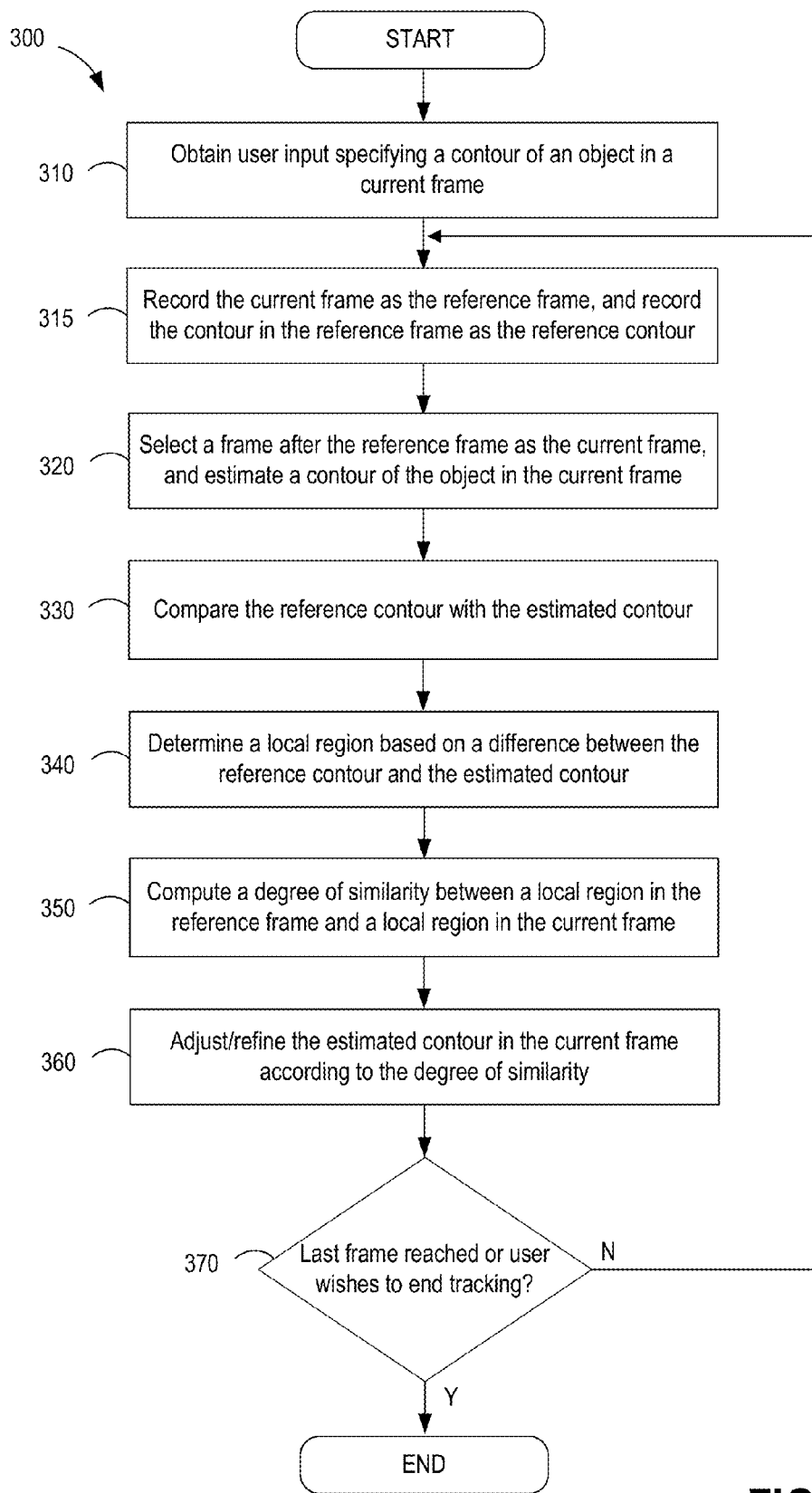
FIG. 3 is a top-level flowchart illustrating examples of functionality implemented as portions of the video editing system of FIG. 1 for facilitating object tracking according to various embodiments of the present disclosure.

Reference is made to FIG. 3, which is a flowchart 300 in accordance with one embodiment for facilitating object tracking performed by the video editing system 102 of FIG. 1. It is understood that the flowchart 300 of FIG. 3 provides merely an example of the many different types of functional arrangements that may be employed to implement the operation of the various components of the video editing system 102 (FIG. 1). As an alternative, the flowchart of FIG. 3 may be viewed as depicting an example of steps of a method implemented in the video editing system 102 according to one or more embodiments.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

Beginning with block 310, the object selector 114 (FIG. 1) in the video editing system 102 obtains user input specifying a contour of an object in a current frame. At this time, the frame serves as a current frame for the iterative tracking process. It may comprise the first frame in a sequence of video frames or any frame in which the user selects as a starting point for tracking an object. The user may specify the contour through any number of selection or control means such as a paint brush tool on a user interface displayed to the user.

The user utilizes the region selection tool to specify or define the contour of the object to be tracked in a video stream. After the tracking results are generated as described in more detail below, the tracking results may then be utilized for video editing. For example, the user may elect to adjust the color and/or brightness of the object or augment frames with the object with content from another video stream.

In block 315, the contour estimator 116 (FIG. 1) records the current frame as the reference frame, and record the contour in the reference frame as the reference contour. In block 320, select a frame after the reference frame as the current frame, and estimate a contour of the object in the current frame. Note that the frame following the reference frame is not limited to the frame immediately following the reference frame and may comprise any frame following the reference frame (e.g., the fifth frame following the reference frame). In this regard, the iterative tracking process involves processing the video sequence by one or more frames during each iteration. Note that for the very first iteration of the tracking process, the reference contour comprises the contour defined by the user. However, for the iterations that follow, the reference contour comprises the refined contour of the next frame and so on.

In block 330, the local region analyzer 119 (FIG. 1) compares the reference contour with the estimated contour. That is, the contour of the reference frame is compared to the contour of the current frame such that contours spanning two successive frames are compared. Note, however, that the various embodiments disclosed are not limited to the comparison of successive frames as the video editing system 102 may be configured to compare frames spaced farther apart.

In block 340, the local region analyzer 119 determines a local region based on a difference between the reference contour and the estimated contour. Referring back to the illustration of FIG. 6, the object contours for a reference frame (n) and the current frame (n+1) are compared. As shown for this example, certain regions or elements 502a, 502b (i.e., the flippers) are missing in frame (n+1). As a result, the missing regions are designated as local regions 602a, 602b for purposes of refining the estimated object contour at frame (n+1).

With reference back to FIG. 3, in block 350, the local region analyzer 119 computes a degree of similarity between a local region 602a, 602b (FIG. 6) in the reference frame (n) and a local region 602a, 602b in the current frame (n+1). For some embodiments, the degree of similarity between local regions 602a, 602b in two frames may be calculated based on a sum of absolute difference (SAD) metric between the pixels in the corresponding local regions 602a, 602b. A low value of the sum of absolute difference indicates a large degree of similarity between the local regions 602a, 602b, and that the local regions 602a, 602b are almost static across the two frames. Based on this, an inference can be made that the object 404 itself has not moved significantly across the two frames.

Figure 12A:
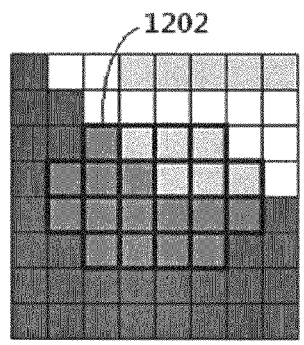
FIG. 12A illustrates how the content close to a local region is shown as an pixel array for a video frame in accordance with various embodiments of the present disclosure.
Figure 12B:
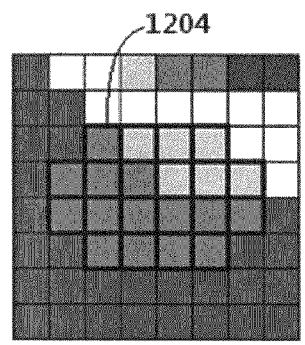
FIG. 12B illustrates the frame content for another video frame.

The sum of absolute difference (SAD) metric used to compute the degree of similarity is described in connection with FIGS. 12A-F. For a video frame, the content close to a local region is shown as an pixel array in FIG. 12A, and the pixels in the local region 1202 are surrounded by the thick lines. The frame content for another video frame is shown in FIG. 12B, where another local region 1204 is shown. For each pixel in a given local region, there is a corresponding pixel in the other local region, where the corresponding pixel is identified according to the structure of the pixel array and based on the locations of the two regions in the video frames.

Determination of the SAD metric comprises computing the absolute difference of pixel values for every pair of pixels and then accumulating the absolute differences as a measurement between the two regions. A smaller SAD value indicates a higher similarity between two regions, while a larger SAD value indicates that the two regions are different. In the examples shown in FIG. 12A and FIG. 12B, only the top-right pixels in the frames are different, and every pair of pixels inside the local regions has the same value. This leads to a zero SAD value, which denotes very high similarity between the local regions.

Figure 12C:
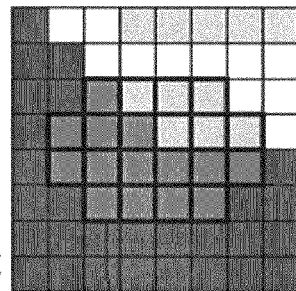
FIGS. 12C and 12D illustrate an example where the local regions cannot be located precisely due to a small shift or deformation between the video frames or an error in the contour estimation.
Figure 12D:
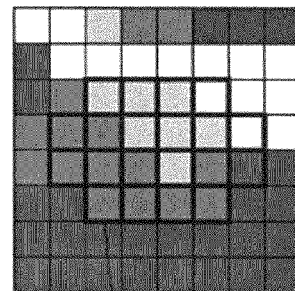

Many times during the tracking process, however, the local regions cannot be located precisely due, for example, to a small shift or deformation between the video frames or an error in the contour estimation. An example of such a scenario is shown in FIG. 12C and FIG. 12D, where the shape of the local region is the same as the previous example, but where the location of local region 1208 has some deformation in shape. Due to this small misalignment, the SAD value computed based on the pixel pairs becomes significantly large, thereby erroneously indicating a small degree of similarity between the local regions.

Figure 12E:
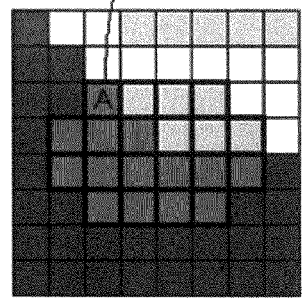
FIGS. 12E and 12F illustrate how a measurement technique is utilized to evaluate local regions that are slightly misaligned while still accurately identifying local regions with a low degree of similarity in accordance with various embodiments of the present disclosure.
Figure 12F:
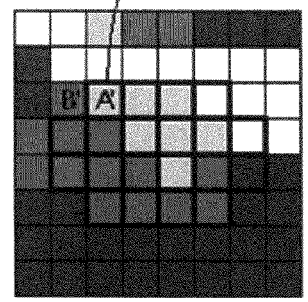

Thus in accordance with various embodiments, a robust measurement is utilized where the SAD metric accurately evaluates local regions that are slightly misaligned while still accurately identifying local regions with a low degree of similarity. To achieve this, an alternative SAD technique is implemented for various embodiments. With reference to FIG. 12E and FIG. 12F, the SAD metric is computed based on pixel pairs. For example, a pixel A in local region 1206 is matched to a corresponding pixel in the other frame. For purposes of this disclosure, the corresponding pixel in the other frame is referred to as an anchor pixel. The original SAD metric matches the pixel A to the anchor pixel A', which leads to a large value of absolute difference. In contrast, the revised SAD metric performs a local search in a small range around the anchor pixel A' and identifies a pixel with the smallest absolute difference. The small range in which the local search is performed may comprise, for example, a pixel block (e.g., 3×3 or 5×5 pixel block where the anchor pixel is located at the center).

In the example shown, a local search reveals that pixel B' has the same value as anchor pixel A' and is therefore selected for purposes of computing the absolute difference. A local search is performed for a plurality of pixel pairs to match a pixel in one frame to another pixel in the other frame. A reasonable range of the local search should be small enough to identify the local regions with obviously different content while also taking into account the misalignment of local regions in one or two pixels. In this example, multiple searches are performed for the regions 1206 and 1208 to compute their SAD value. Each search yields a pixel pair from one region to the other region. Each local search may also select a pixel with a different position relative to the anchor pixel used for the search. For example, the selected pixel B is one pixel left to the anchor pixel A', but the selected pixel in another search may involve a pixel in a different position where the pixel is not located one pixel left to the anchor pixel. This allows pixel matching between two regions where slight deformation occurs, which is typical during video tracking.

Based on the disclosed local search mechanism, the final SAD value is computed based on the following formula:

$$SAD(R_1,R_2) = \Sigma_{p_i \in P_1} \min_{q_j \in S(anchor(p_i))} D(v(p_i), v(q_j)),$$

where $R_1$, $R_2$ are the two regions, $P_1$ is a set of pixels which can be all pixels or a subset of pixels in $R_1$. For each pixel $p_i$ in $P_1$, anchor($p_i$) is the anchor pixel in the video frame containing $R_2$. The anchor pixel corresponds to the pixel $p_i$ and can be determined by the locations of two regions in the video frames. S(anchor($p_i$)) represents a set of pixels as the search region according to anchor($p_i$), and the search is performed for each pixel $q_j$ in the search region. The values of pixel $p_i$, $q_j$ are represented as $v(p_i)$, $v(q_j)$, and $D(v(p_i), v(q_j))$ is a metric for computing the absolute difference of the values such that $v(p_i) = \{v_1(p_i), \ldots, v_n(p_i)\}$, $v(q_j) = \{v_1(q_j), \ldots, v_n(q_j)\}$.

In various embodiments, each pixel contains a fixed number of channels and there is a value for each channel. Each pixel contains at least one channel with a value, wherein $D(v(p_i), v(q_j))$ corresponds to the absolute difference of the values according to one of the following formulas:

$$D(v(p_i), v(q_j)) = \Sigma_{k=1}^{n} \|v_k(p_i) - v_k(q_j)\|,$$

$$D(v(p_i), v(q_j)) = \Sigma_{k=1}^{n} (v_k(p_i) - v_k(q_j))^2, \text{ or}$$

$$D(v(p_i), v(q_j)) = \sqrt{\Sigma_{k=1}^{n} (v_k(p_i) - v_k(q_j))^2},$$

where $\|x\|$ is the absolute value of x. The metric corresponds to computing the absolute difference between the values of the two pixels for each channel and then accumulating the absolute differences among all channels. However, in some cases, another metric may be used represent the discrimination of pixel values, such as computing the square values of the differences and then accumulating the squared values. The pixel $q_j$ that contributes to the summation in SAD($R_1$, $R_2$) is the pixel which results in the minimal absolute difference within the search region. By leveraging this revised SAD technique, the SAD value computed from local regions 1206, 1208 is a relatively small value and indicates a high degree of similarity between the local regions 1206, 1208.

Thus, when the local regions 602a, 602b are very similar across two frames, an estimated contour with the local region(s) omitted will likely be an erroneous estimate as the estimated contour differs substantially from the previously estimated contour. In cases where there is not a large degree of similarity of the local regions 602a, 602b across two frames, this typically means that the object has moved significantly or the shape of the object has changed substantially between frames. For such cases, no further refinement is made to the estimated contour.

In block 360, based on the degree of similarity, the contour estimator 116 adjusts or further refines the estimated contour. In cases where there is a large degree of similarity between the local regions 602a, 602b across two frames and where the respective estimated contours differ substantially (e.g., where one of the estimated contours is missing the local region), the contour estimator 116 may be configured to incorporate the missing local region(s) into the erroneous estimated contour as part of the refinement process.

Figure 8:
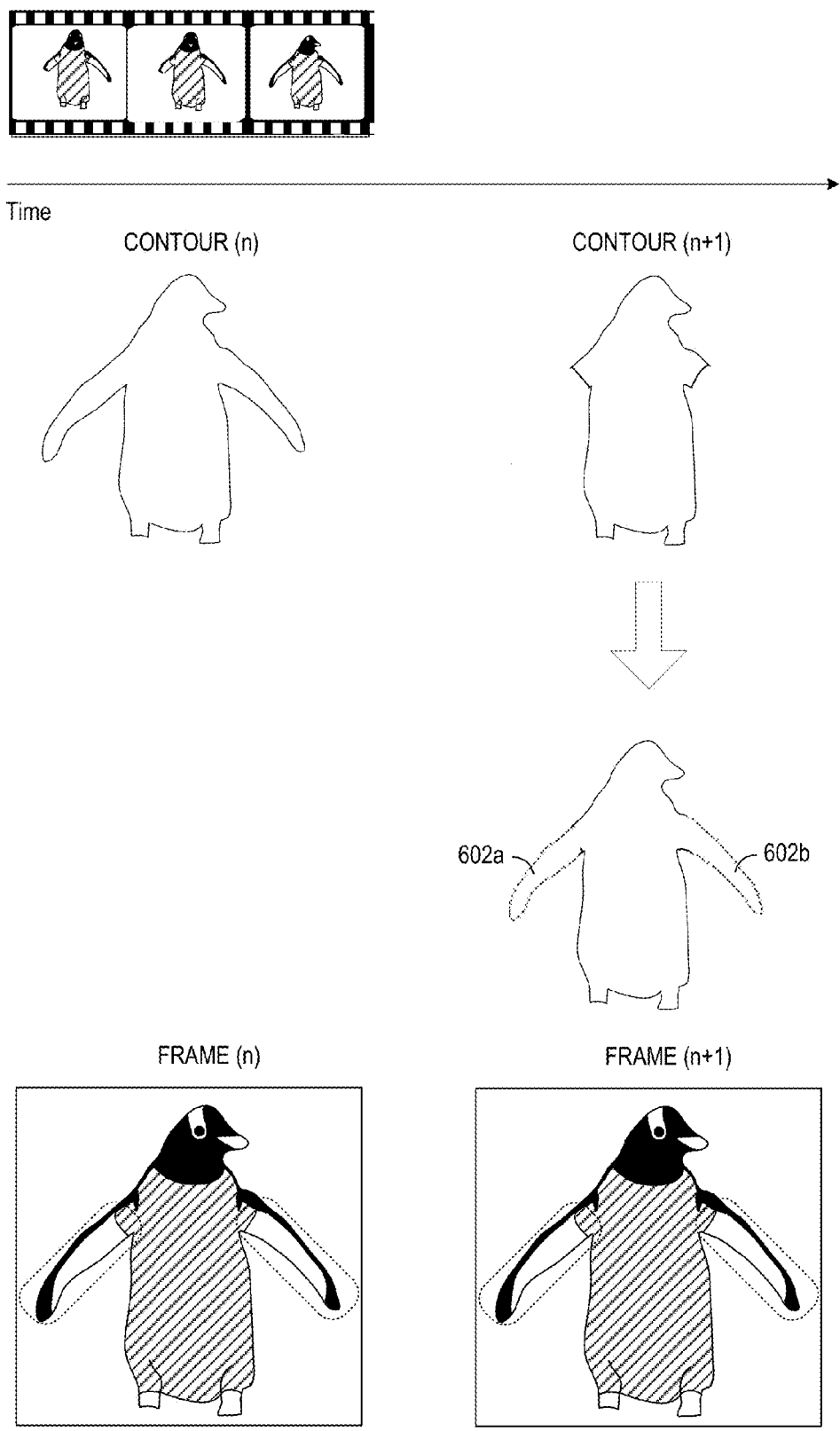
FIG. 8 illustrates the refinement of an estimated contour performed by the video editing system of FIG. 1 in accordance with various embodiments of the present disclosure.

To further illustrate the operations discussed above for blocks 350 and 360, reference is made to FIG. 8, which illustrates estimated object contours across two frames (i.e., frame (n) and frame (n+1)). As described earlier in connection with FIG. 6, the local regions 602a, 602b comprise the difference between the contours in the two frames. In the example of FIG. 8, there is a large degree of similarity between the local regions 602a, 602b across two frames and the respective estimated contours differ substantially (e.g., where one of the estimated contours is missing the local regions 602a, 602b). The large degree of similarity between the local regions 602a, 602b may be determined based on a sum of absolute difference between pixels in the corresponding local regions 602a, 602b. In this regard, a comparison between pixel characteristics (e.g., pixel color) is performed on a pixel-by-pixel basis between the local regions 602a, 602b in each frame (frame (n) and frame (n+1)).

In the example of FIG. 8, there is a large degree of similarity between the local regions 602a, 602b across two frames and the respective estimated contours differ substantially (e.g., where one of the estimated contours is missing the local region). In this case, the contour estimator 116 (FIG. 1) may be configured to incorporate the missing local regions 602a, 602b into the erroneous estimated contour of frame (n+1) as part of the refinement process, as shown in FIG. 8.

At decision block 370, a determination is made on whether the last frame in the video stream has been processed or whether the user wishes to stop the tracking process. If neither condition is true, the tracking process resumes back at block 315, where the contour estimation and local region comparison operations outlined in the blocks that follow are repeated. Returning back to decision block 370, if at least one of the conditions is true, then the object tracking process stops, and the user may then perform other operations via the video editing system 102, such as editing the tracked object based on the tracking results derived in the remaining blocks above.

To further illustrate the various concepts disclosed, reference is made to FIGS. 7 and 9-11, which illustrate various aspects of object tracking technique in accordance with various embodiments of the present disclosure. FIGS. 7A-F illustrate an example application of performing object tracking. In FIG. 7A, the user selects or defines the contour of the object (i.e., the dog) using a selection tool such as brush tool as represented by the cursor tool shown.

The contour drawn around the object is represented by the outline surrounding the object. For the video frames that follow (as shown in FIGS. 7B-E), the object tracking algorithm estimates the contour of the object on a frame-by-frame basis as the object moves and as the shape of the object changes. The object tracking results across the series of frames can then be utilized for editing purposes. As illustrated in FIG. 7F, based on the estimated contour, the object may be modified (e.g., color change) without modifying any of the other regions in the frame. In this regard, accurate object tracking is needed to facilitate video editing operations.

Typically, the object being tracked moves or the shape of the object changes over time. However, the amount of movement tends to be fairly small within a short amount of time. Successive frames in a video are typically spaced apart by approximately $1/30^{th}$ of a second. Thus, even if the object is moving or if the shape of the object changes, the rate of change is relatively small on a frame-by-frame basis.

Figure 9A:
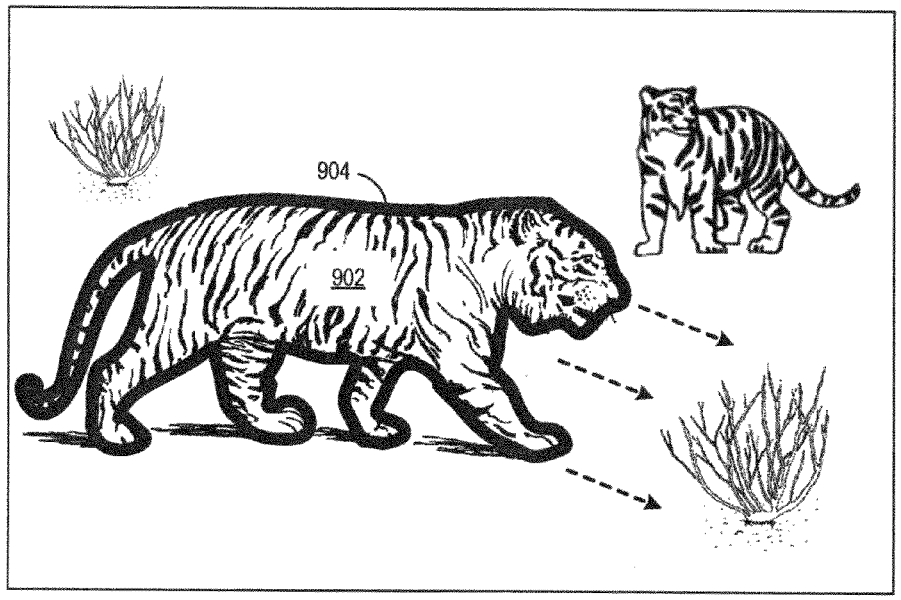
FIG. 9A illustrates an initial video frame or reference frame with an object that the user wishes to track.
Figure 9B:
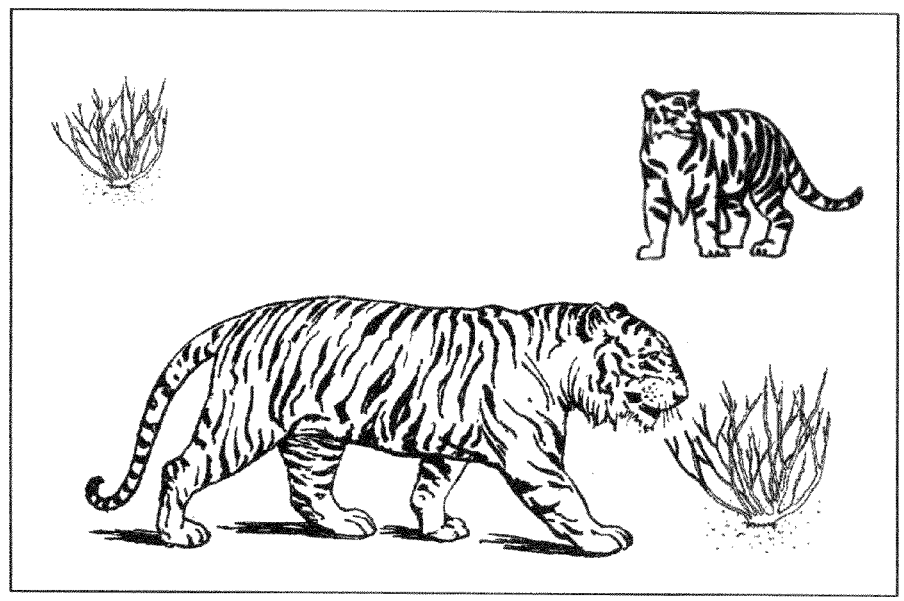
FIG. 9B illustrates a next frame in the video sequence.
Figure 9C:
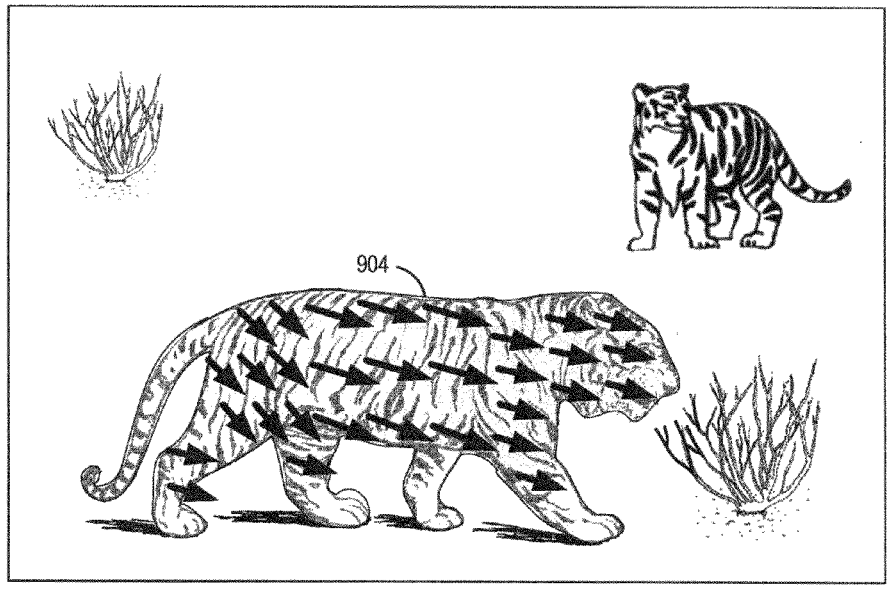
FIG. 9C illustrates estimation of the direction of movement and the magnitude of movement in accordance with various embodiments of the present disclosure.

FIGS. 9A-F further illustrate the refinement operation of an estimated contour in accordance with various embodiments, where the difference between video frames is analyzed. FIG. 9A depicts an initial video frame or reference frame (frame (n)) with an object 902 that the user wishes to track. The bold line around the object 902 to be tracked represents an object contour 904 specified by the user using, for example, a paint brush tool or other selection tool via a user interface displayed to the user. Assume for purposes of illustration (and as shown in FIGS. 9B-F) that the object 902 moves in a downward direction towards the right. FIG. 9B depicts the next frame (e.g., frame (n+1)) in the video sequence. For every region within the object, the direction of movement and the magnitude of movement are estimated, as illustrated in FIG. 9C, where the arrows represent the direction and magnitude of movement by the object.

Figure 9D:
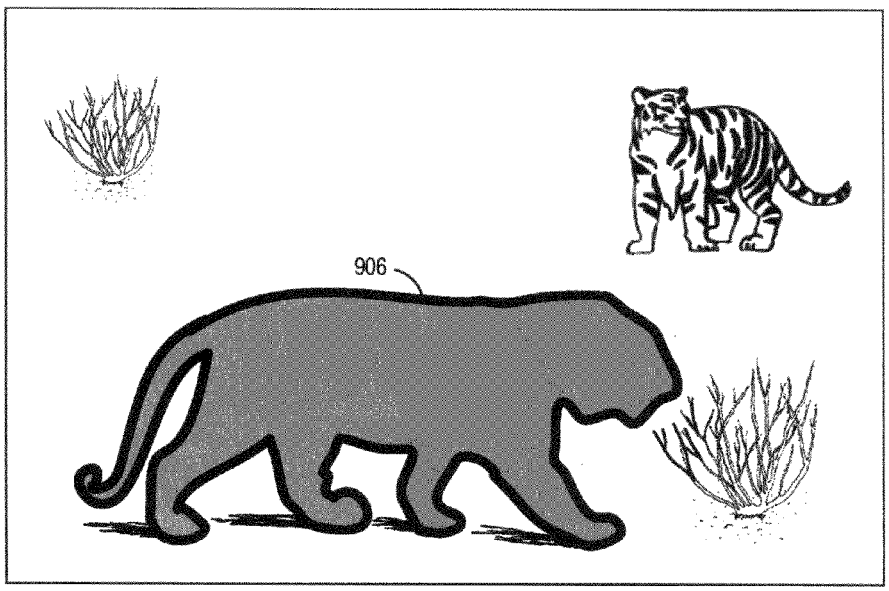
FIG. 9D illustrates a resulting object contour after the shape of the object contour is modified in accordance with various embodiments of the present disclosure.

Based on the information represented by the arrows in FIG. 9C, the shape of the object contour 904 is warped or modified where the resulting object contour 906 is shown in FIG. 9D. Note that for some embodiments, motion estimation may be performed on all the pixels in the entire frame and not just on those pixels within the object contour 904. For such embodiments, the frame may be divided into blocks where motion estimation is then performed on each block.

Figure 9E:
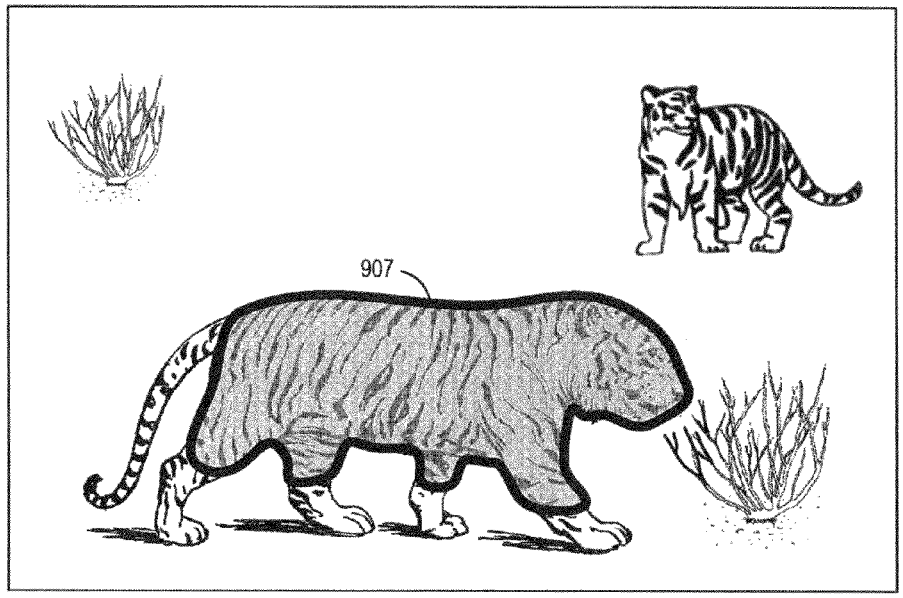
FIG. 9E illustrates an example where the estimated contour is missing a portion of the object.

Assume, for purposes of illustration, that the object tracking algorithm loses track of one or more portions/regions of the object 902. As shown in FIG. 9E, the estimated contour 907 is missing the tail and the feet of the tiger (the object 902 being tracked). In this scenario, the modified contour 906 in FIG. 9D rather than the initial contour 904 in FIG. 9A specified by the user is used as the reference contour in the comparison for purposes of identifying the one or more local regions as the modified contour 906 in FIG. 9D provides a better estimation of the object shape in the next frame as it incorporates the difference between the reference frame depicted in FIG. 9A and the current frame depicted in FIG. 9E. Moreover, the estimated movements can be used to shift the corresponding local regions in the two frames in order to more accurately track the missing regions of the object (e.g., the tail and feet of the tiger) more accurately. Note that at this moment, there are three contours: 1) the original reference contour 904; 2) the modified contour 906 derived based on motion estimation; and 3) the estimated contour 907 in the current frame derived by an arbitrary tracking algorithm.

Figure 9F:
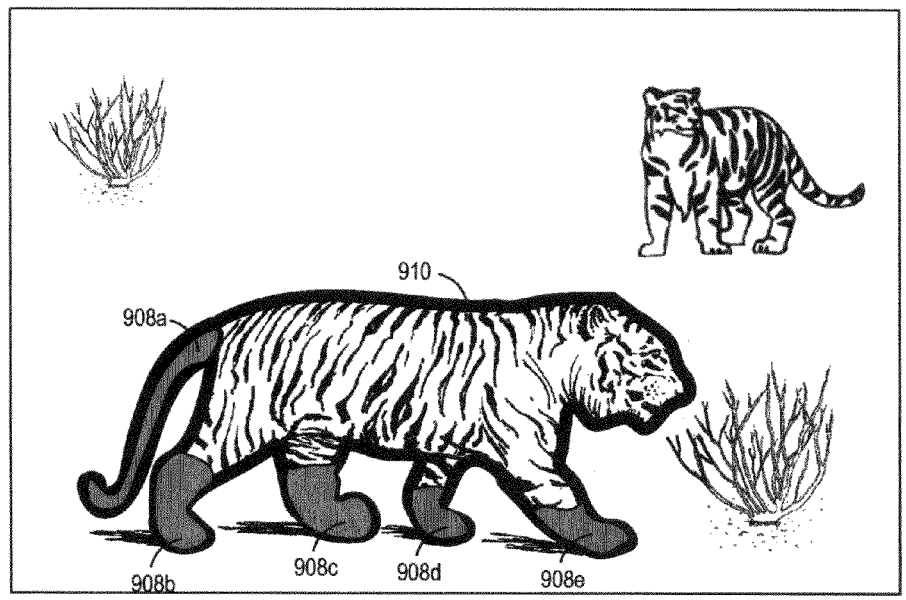
FIG. 9F illustrates the result of a refined estimated contour in accordance with various embodiments of the present disclosure.

As shown in FIG. 9F, by supplementing the erroneous contour estimation 907 in FIG. 9E with the local regions 908a, 908b, 908c, 908d, 908e encompassing the tiger's tail and feet, a refined estimated contour 910 including the local regions 908a, 908b, 908c, 908d, 908e is derived to provide a more accurate estimation object contour. For some embodiments, supplementing an erroneous contour estimation with the local region(s) comprises performing a union operation or determination on the estimated contour and the local region to merge the two into a larger region.

Figure 10A:
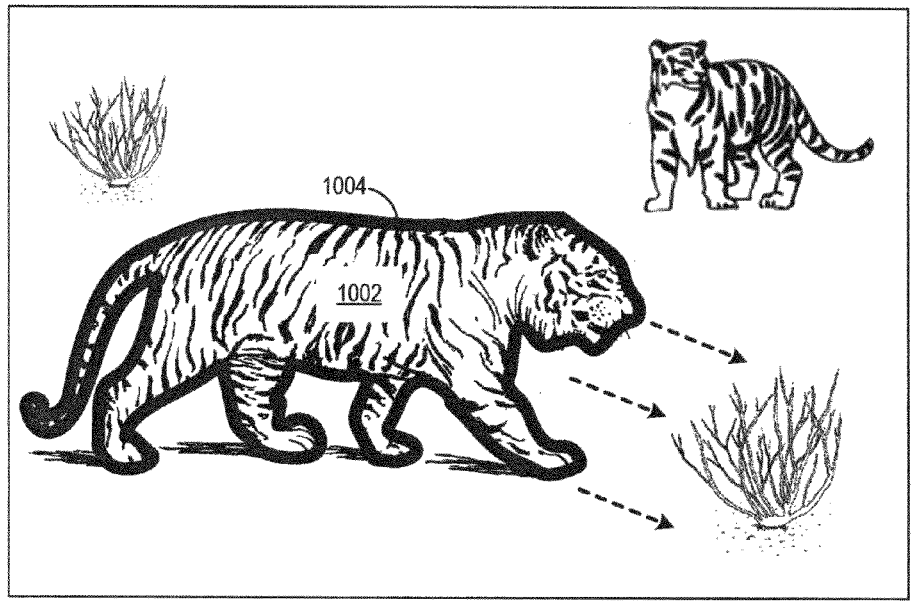
FIG. 10A illustrates an initial video frame with an object that the user wishes to track.

Note that the refinement technique disclosed may also remove regions that are erroneously included in a contour estimation. Reference is made to FIGS. 10A-E, which provide another example of the refinement of an estimated contour performed by the video editing system of FIG. 1 in accordance with various embodiments of the present disclosure. FIG. 10A depicts an initial video frame (frame (n)) with an object 1002 that the user wishes to track. The bold line around the object 1002 to be tracked represents an object contour 1004 specified by the user using, for example, a paint brush tool or other selection tool via a user interface displayed to the user. Assume for purposes of illustration (and as shown in FIGS. 10B-E) that the object 902 moves in a downward direction towards the right.

Figure 10B:
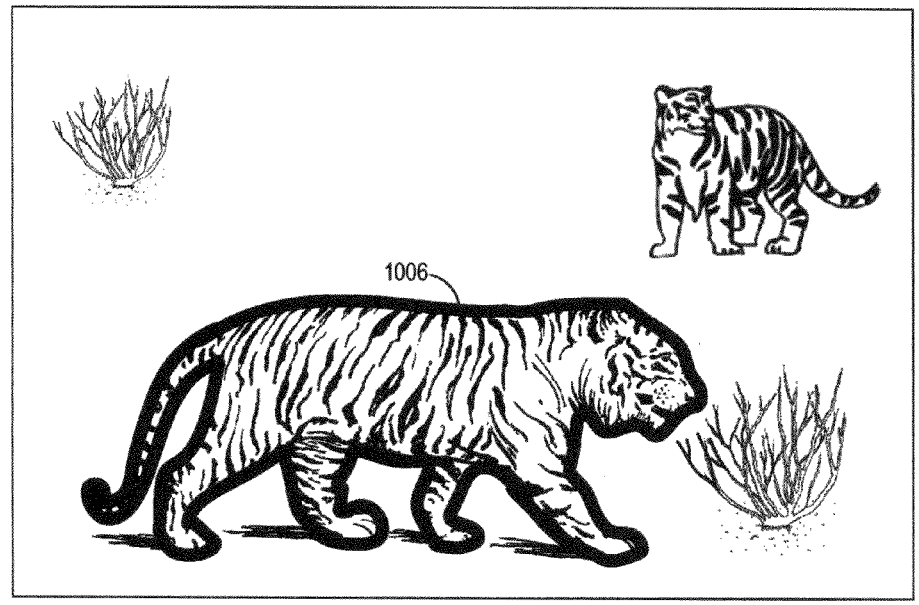
FIG. 10B illustrates a next frame in the video sequence.

FIG. 10B depicts the next frame (e.g., frame (n+1)) in the video sequence. Again, for every region of the object, the direction of movement and the magnitude of movement are estimated. Based on motion estimation, the shape of the object contour 1004 is warped or modified where the resulting object contour 1006 is shown in FIG. 10B. Note that for some embodiments, motion estimation may be performed on all the pixels in the entire frame and not just on those pixels within the object contour 1002. For such embodiments, the frame may be divided into blocks where motion estimation is then performed on each block.

Figure 10C:
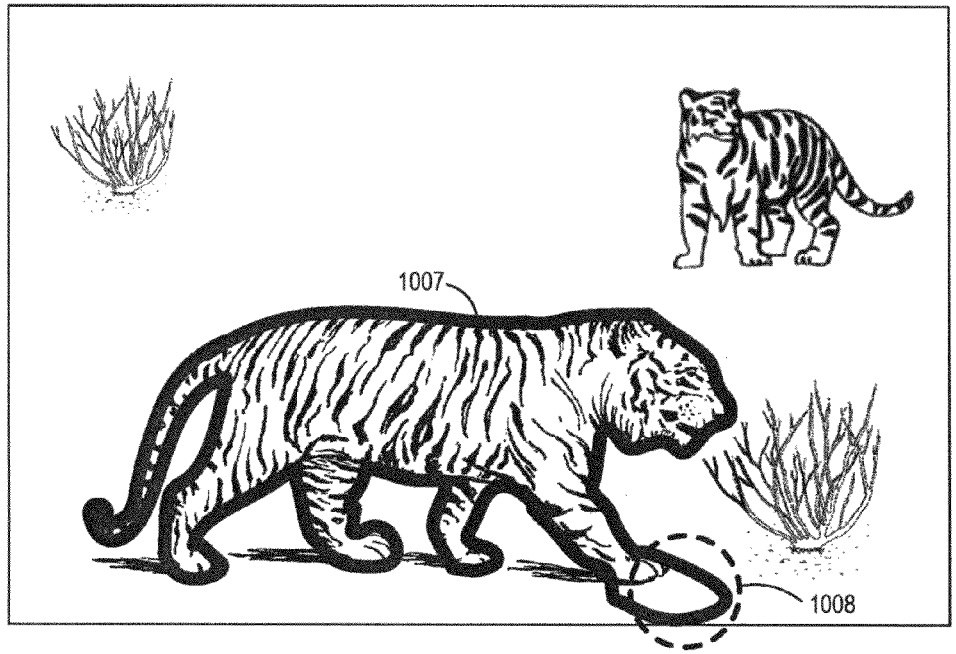
FIG. 10C illustrates an example of an estimated contour that erroneouly includes an additional region.
Figure 10D:
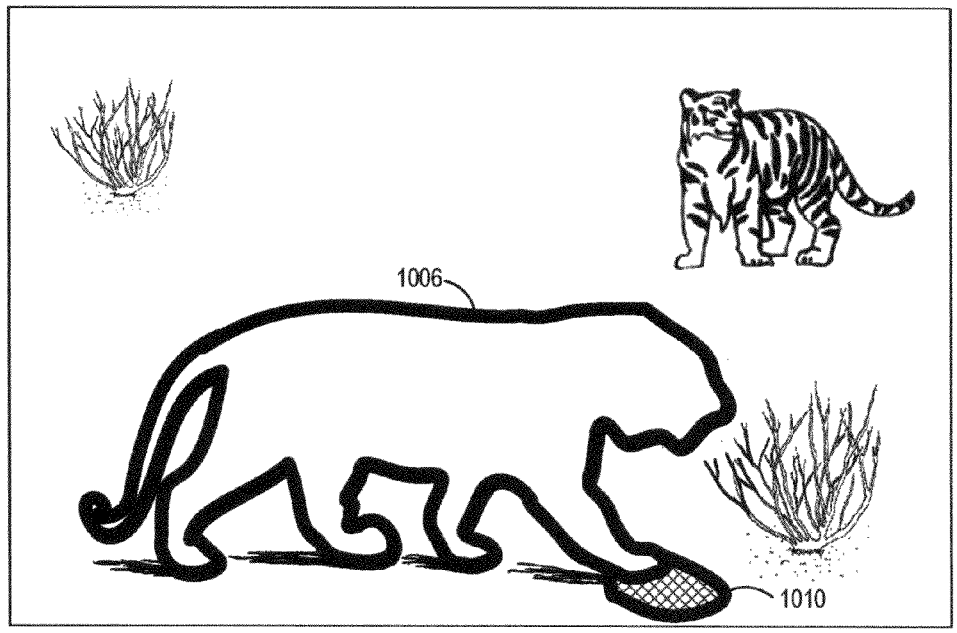
FIG. 10D illustrates identification of the additional region in accordance with various embodiments of the present disclosure.
Figure 10E:
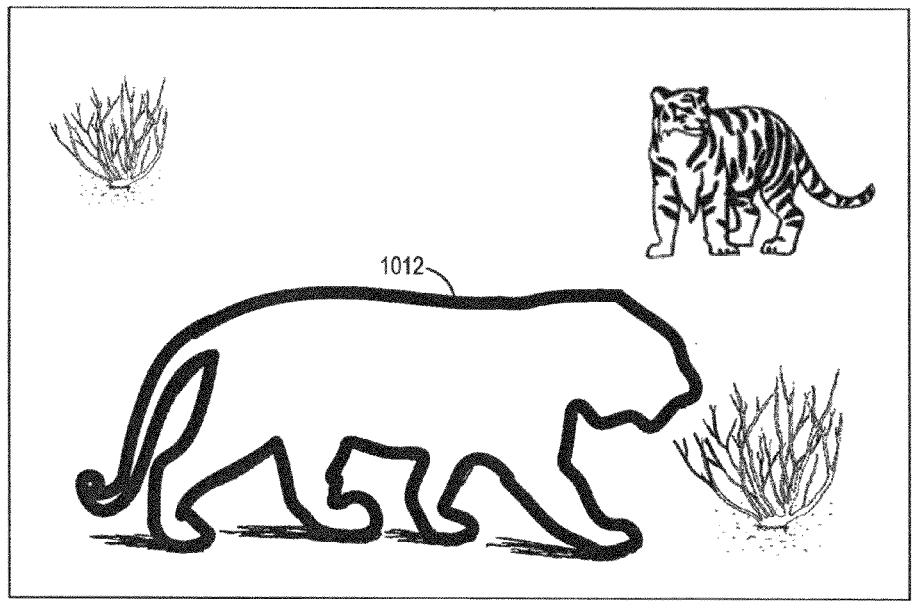
FIG. 10E illustrates the result of a refined estimated contour in accordance with various embodiments of the present disclosure.

With reference to FIG. 10C, assume for the example shown that a region 1007 is the tracking result for the frame, and a part of region 1008 is erroneously included the result that was not included in the estimated contour 1006. In this scenario, the refinement method identifies this additional region as a local region 1010 (FIG. 10D) and removes the erroneous region from the estimated contour to generate a refined estimated contour, as shown in FIG. 10E. Note also that information from motion estimation may be utilized to improve the accuracy in removing erroneous regions.

In some cases, certain restrictions may be implemented during the object tracking process disclosed in order to further enhance the accuracy of generating an estimated contour. For embodiments of the object tracking technique disclosed, a major assumption is that the previous tracking result contains an accurate estimation of the contour. Based on this assumption, the estimated contour may be further refined on a frame-by-frame basis.

Over time, however, the contour of the object may change substantially, thereby resulting in erroneous adjustments made based on an erroneous contour. As such, comparison of other attributes other than the local regions may also be used, where such attributes include, for example, the color of the object and the color of the background. If the color of the region is close to the background color, then refining the estimated contour using this region may lead to an erroneous refinement due to the color of the local region matching the color of the background. As such, by utilizing other comparisons, the refinement process may be improved.

Figure 11A:
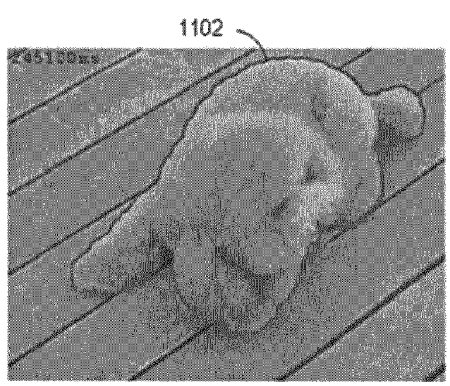
FIG. 11A illustrates an initial video frame and the object contour input by the user.
Figure 11B:
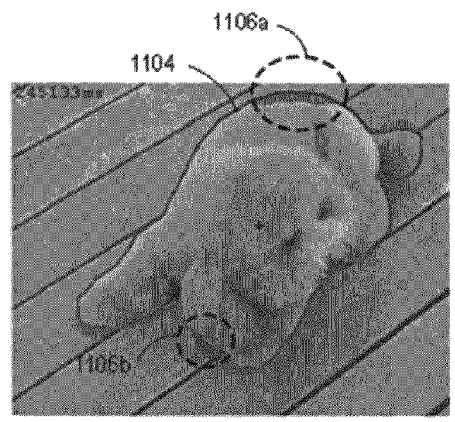
FIG. 11B illustrates the next video frame, where local regions are used for refinement of the estimated contour in accordance with various embodiments of the present disclosure.

To further illustrate, reference is made to FIGS. 11A-D, which illustrate how the object contour may change substantially over time. The initial video frame and the object contour 1102 input by the user are shown in FIG. 11A. FIG. 11B depicts the next video frame, where the two local regions 1106a, 1106b are used for refinement of the estimated contour 1104, as described herein. A comparison of the local regions of the two frames (FIGS. 11A and 11B) reveals that the local regions have an intermediate similarity in the video frames. Also, the reference contour is exactly the original contour 1102 specified by the user in FIG. 11A, and this implies the highest degree of agreement between the original contour and the reference contour. Accordingly, looser restrictions may be applied during the refinement process.

Figure 11C:
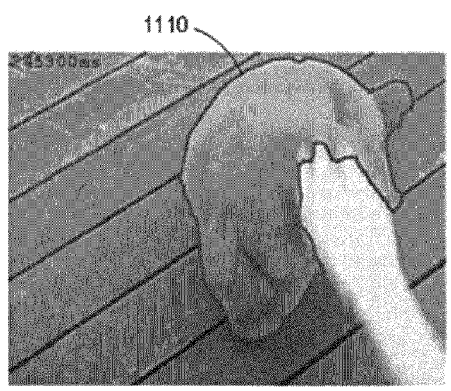
FIGS. 11C and 11D illustrate an example of how the contour can change substantially due to partial occlusion of the tracked object by an individual's hand in the frame.
Figure 11D:
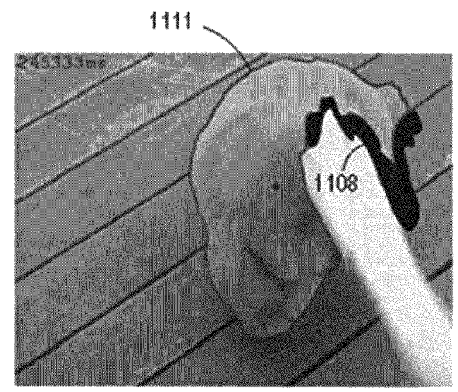

As shown in the example of FIGS. 11C and 11D, however, the contour can change substantially due, for example, to partial occlusion of the tracked object by an individual's hand in the frame. A comparison of the local regions between the frames in FIGS. 11C and 11D reveals a difference represented by the region 1108 shown in FIG. 11D. However, a comparison of the reference contour 1110 in FIG. 11C with the original contour 1102 specified by the user in FIG. 11A reveals that the contour 1110 has changed substantially over time during the tracking process. In this case, stricter restrictions may be applied to the threshold of the similarity in order to avoid erroneously refining the estimated contour using regions that are not part of the tracked object (e.g., the individual's hand). For the local region 1008, the similarity is not high enough to pass the stricter restrictions, so it will not be used to refine the contour.

For some embodiments, the original contour shape 1102 specified by the user is compared to the reference contour 1110 by calculating a degree of similarity between the original contour shape 1102 and the reference contour 1110 to determine whether the two are substantially similar. If the reference contour 1110 is substantially similar to the original contour 1102 specified by the user, then looser restrictions are applied, otherwise stricter restrictions are applied.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in an image editing device for tracking an object in a plurality of frames, comprising:
    obtaining a reference contour of an object in a reference frame;
    estimating, for a current frame after the reference frame, a contour of the object;
    comparing the reference contour with the estimated contour;
    determining at least one local region of the reference contour in the reference frame based on a difference between the reference contour and the estimated contour;
    based on the difference, determining at least one corresponding region of the current frame;
    computing a degree of similarity between the at least one corresponding region in the current frame and the at least one local region in the reference frame;
    adjusting the estimated contour in the current frame according to the degree of similarity, wherein the degree of similarity is determined in response to the degree of similarity being greater than a threshold and in response to the difference between the reference contour and the estimated contour; and
    wherein if at least one region is not included in the estimated contour, adding the at least one local region as part of the estimated contour for the current frame; and
    designating the current frame as a new reference frame and a frame after the new reference as a new current frame.

2. The method of claim 1, wherein the reference contour is specified by a user via a user interface.

3. The method of claim 1, wherein computing the degree of similarity between the at least one corresponding region in the current frame and the at least one local region in the reference frame is based on a sum of absolute difference between pixels in the current frame and pixels in the reference frame based on the at least one local region and the at least one corresponding region.

4. The method of claim 3, wherein computing the degree of similarity between the at least one corresponding region in the current frame and the at least one local region in the reference frame based on the sum of absolute difference between pixels comprises:
    determining a plurality of pixel pairs in the frames;
    computing absolute differences of the pixel values for the pixel pairs; and
    computing the sum of absolute difference value based on absolute differences.

5. The method of claim 4, wherein determining the plurality of pixel pairs in the frames is performed according to a location of the local region in the reference frame and a location of a corresponding region in the current frame, each pixel pair comprising a pixel in the current frame and a pixel in the reference frame.

6. The method of claim 4, wherein computing the sum of absolute difference value comprises computing the sum of absolute difference of a region $R_1$ and the other region $R_2$ based on the formula:

$$SAD(R_1,R_2)=\Sigma_{p_i \in P_1} \min_{q_j \in S(anchor(p_i))} D(v(p_i),v(q_j)),$$

wherein $P_1$ is a subset of the pixels in the frame within $R_1$; $p_i$ is a pixel in $P_1$; anchor($p_i$) is the anchor pixel corresponding to pixel $p_i$ and is located in the other frame containing $R_2$; S(anchor($p_i$)) is a set of pixels determined by the anchor pixel; $q_j$ is a pixel in S(anchor($p_i$)); $v(p_i)$, $v(q_j)$ are the values of pixel $p_i$, $q_j$; and $D(v(p_i), v(q_j))$ is a metric for computing the absolute difference of the values.

7. The method of claim 6, wherein S(anchor(pi)) is a set of pixels determined by anchor(pi), wherein S(anchor(pi)) is the set of pixels with a spatial distance to anchor(pi) less than a predefined threshold.

8. The method of claim 6, wherein $D(v(p_i), v(q_j))$ correspond to a metric for computing the absolute difference of the values such that $v(p_i)=\{v_1(p_i), \ldots, v_n(p_i)\}$, $v(q_j)=\{v_1(q_j), \ldots, v_n(q_j)\}$, wherein each pixel contains at least one channel with a value, wherein $D(v(p_i), v(q_j))$ corresponds to the absolute difference of the values calculated according to one of the following formulas:

$$D(v(p_i),v(q_j))=\Sigma_{k=1}^{n}\|v_k(p_i)-v_k(q_j)\|,$$

$$D(v(p_i),v(q_j))=\Sigma_{k=1}^{n}(v_k(p_i)-v_k(q_j))^2, \text{ or}$$

$$D(v(p_i),v(q_j))=\sqrt{\Sigma_{k=1}^{n}(v_k(p_i)-v_k(q_j))^2},$$

wherein $\|x\|$ is the absolute value of x.

9. A method implemented in an image editing device for tracking an object in a plurality of frames, comprising:
   obtaining a reference contour of an object in a reference frame;
   estimating, for a current frame after the reference frame, a contour of the object;
   comparing the reference contour with the estimated contour;
   determining at least one local region of the estimated contour in the current frame based on a difference between the reference contour and the estimated contour;
   based on the difference, determining at least one corresponding region of the reference frame;
   computing a degree of similarity between the at least one corresponding region in the reference frame and the at least one local region in the current frame;
   adjusting the estimated contour in the current frame according to the degree of similarity, wherein adjusting the estimated contour in the current frame according to the degree of similarity comprises: in response to the degree of similarity being greater than a threshold and in response to the difference between the reference contour and the estimated contour comprising at least one region not included in the reference contour, removing the at least one local region from the estimated contour of the current frame; and
   designating the current frame as a new reference frame and a frame after the new reference as a new current frame.

10. The method of claim 1, wherein comparing the reference contour with the estimated contour comprises:
    performing motion estimation on pixels within the reference contour in the reference frame;
    modifying the reference contour based on the motion estimation; and
    using the modified reference contour in the comparison with the estimated contour.

11. The method of claim 1, wherein an original contour of the object is obtained, and adjusting the estimated contour in the current frame further comprises:
    computing a degree of agreement between the original contour and the reference contour; and
    adjusting the estimated contour according to the degree of similarity between the regions and the degree of agreement between the contours.

12. The method of claim 11, wherein the original contour is obtained by a user via a user interface.

13. The method of claim 11, wherein the degree of agreement between the original contour and the reference contour is computed according to the area of overlapped region for the contours.

14. The method of claim 11, wherein adjusting the estimated contour is performed in response to the degree of similarity between the regions being greater than a threshold, and wherein the threshold is determined according to the degree of agreement between the contours such that a lower threshold is set for a higher degree of agreement and a higher threshold is set for a lower degree of agreement.

15. The method of claim 1, wherein all the steps are repeated until at least one of the following conditions is met:
    a last frame in the plurality of frames is processed; and
    the user halts the tracking process.

16. A system for tracking an object in a plurality of frames, comprising:
    a processing device;
    an object selector executable in the processing device for obtaining a reference contour of an object in a reference frame;
    a contour estimator executable in the processing device for estimating, for a current frame after the reference frame, a contour of the object;
    a local region analyzer executable in the processing device for:
    comparing the reference contour with the estimated contour;
    determining at least one local region of the reference contour in the reference frame based on a difference between the reference contour and the estimated contour;
    determining at least one corresponding region of the current frame based on the difference; and
    computing a degree of similarity between the at least one corresponding region in the current frame and the at least one local region in the reference frame,
    wherein the contour estimator adjusts the estimated contour in the current frame according to the degree of similarity and designates the current frame as a new reference frame and a frame after the new reference as a new current frame, wherein the degree of similarity is determined in response to the degree of similarity being greater than a threshold and in response to the difference between the reference contour and the estimated contour; and
    wherein if at least one region is not included in the estimated contour, adding the at least one local region as part of the estimated contour for the current frame.

17. The system of claim 16, wherein the reference contour is specified by a user via a user interface.

18. The system of claim 16, wherein computing the degree of similarity between the at least one corresponding region in the current frame and the at least one local region in the reference frame is based on a sum of absolute difference between pixels in the current frame and pixels in the reference frame based on the at least one corresponding region and the at least one local region.

19. The system of claim 18, wherein computing the degree of similarity between the at least one corresponding region in the current frame and the at least one local region in the reference frame based on the sum of absolute difference between pixels comprises:
    determining a plurality of pixel pairs in the frames;
    computing absolute differences of the pixel values for the pixel pairs; and
    computing the sum of absolute difference value based on absolute differences.

20. The system of claim 19, wherein determining the plurality of pixel pairs in the frames is performed according to a location of the local region in the reference frame and a location of a corresponding region in the current frame, each pixel pair comprising a pixel in the current frame and a pixel in the reference frame.

21. The system of claim 19, wherein computing the sum of absolute difference value comprises computing the sum of absolute difference of a region $R_1$ and the other region $R_2$ based on the formula:

$$SAD(R_1,R_2)=\Sigma_{p_i \in P_1} \min_{q_j \in S(anchor(p_i))} D(v(p_i),v(q_j)),$$

wherein $P_1$ is a subset of the pixels in the frame within $R_1$; $p_i$ is a pixel in $P_1$; anchor($p_i$) is the anchor pixel corresponding to pixel $p_i$ and is located in the other frame containing $R_2$; S(anchor($p_i$)) is a set of pixels determined by the anchor pixel; $q_j$ is a pixel in S(anchor($p_i$)); v($p_i$), v($q_j$) are the values of pixel $p_i$, $q_j$; and D(v($p_i$), v($q_j$)) is a metric for computing the absolute difference of the values.

22. A system for tracking an object in a plurality of frames, comprising:
   a processing device;
   an object selector executable in the processing device for obtaining a reference contour of an object in a reference frame;
   a contour estimator executable in the processing device for estimating, for a current frame after the reference frame, a contour of the object; and
   a local region analyzer executable in the processing device for:
      comparing the reference contour with the estimated contour;
      determining at least one local region of the estimated contour in the current frame based on a difference between the reference contour and the estimated contour;
      based on the difference, determining at least one corresponding region of the reference frame; and
      computing a degree of similarity between the at least one corresponding region in the reference frame and the at least one local region in the current frame,
   wherein the contour estimator adjusts the estimated contour in the current frame according to the degree of similarity and designates the current frame as a new reference frame and a frame after the new reference as a new current frame, wherein adjusting, by the contour estimator, the estimated contour in the current frame according to the degree of similarity comprises: in response to the degree of similarity being greater than a threshold and in response to the difference between the reference contour and the estimated contour comprising at least one region not included in the reference contour, removing the at least one local region from the estimated contour of the current frame.

23. The system of claim 16, wherein comparing the reference contour with the estimated contour comprises:
   performing motion estimation on pixels within the reference contour in the reference frame;
   modifying the reference contour based on the motion estimation; and
   using the modified reference contour in the comparison with the estimated contour.

24. The system of claim 16, wherein an original contour of the object is obtained, and adjusting the estimated contour in the current frame further comprises:
   computing a degree of agreement between the original contour and the reference contour; and
   adjusting the estimated contour according to the degree of similarity between the regions and the degree of agreement between the contours.

25. The system of claim 24, wherein the original contour is obtained by a user via a user interface.

26. The system of claim 24, wherein the degree of agreement between the original contour and the reference contour is computed according to the area of overlapped region for the contours.

27. The system of claim 24, wherein adjusting the estimated contour is performed in response to the degree of similarity between the regions being greater than a threshold, and wherein the threshold is determined according to the degree of agreement between the contours such that a lower threshold is set for a higher degree of agreement and a higher threshold is set for a lower degree of agreement.

28. A non-transitory computer-readable medium embodying a program executable in a computing device, comprising:
   code that generates a user interface and obtains a reference contour of an object in a reference frame;
   code that estimates, for a current frame after the reference frame, a contour of the object;
   code that compares the reference contour with the estimated contour;
   code that determines at least one local region of the reference contour in the reference frame based on a difference between the reference contour and the estimated contour;
   code that determines at least one corresponding region of the current frame based on the difference;
   code that computes a degree of similarity between the at least one corresponding region in the current frame and the at least one local region in the reference frame;
   code that adjusts the estimated contour in the current frame according to the degree of similarity, wherein the code that adjusts the estimated contour in the current frame according to the degree of similarity is determined in response to the degree of similarity being greater than a threshold and in response to the difference between the reference contour and the estimated contour; and
   wherein if at least one region is not included in the estimated contour, adding the at least one local region as part of the estimated contour for the current frame; and
   code that designates the current frame as a new reference frame and a frame after the new reference as a new current frame.

29. The non-transitory computer-readable medium of claim 28, wherein the code that computes the degree of similarity between the at least one corresponding region in the current frame and the at least one local region in the reference frame computes the degree of similarity based on a sum of absolute difference between pixels in the current frame and pixels in the reference frame based on the at least one corresponding region and the at least one local region.

30. A non-transitory computer-readable medium embodying a program executable in a computing device, comprising:
   code that generates a user interface and obtains a reference contour of an object in a reference frame;
   code that estimates, for a current frame after the reference frame, a contour of the object;
   code that compares the reference contour with the estimated contour;
   code that determines at least one local region of the estimated contour in the current frame based on a difference between the reference contour and the estimated contour;
   code that determining at least one corresponding region of the reference frame based on the difference;
   code that computes a degree of similarity between the at least one corresponding region in the reference frame and the at least one local region in the current frame;
   code that adjusts the estimated contour in the current frame according to the degree of similarity, wherein the code that adjusts the estimated contour in the current frame according to the degree of similarity removes the at least one local region from the estimated contour of the current frame in response to the degree of similarity being greater than a threshold and in response to the difference between the reference contour and the estimated contour comprising at least one region not included in the reference contour; and code that designates the current frame as a new reference frame and a frame after the new reference as a new current frame.

31. The non-transitory computer-readable medium of claim 28, wherein the code that compares the reference contour with the estimated contour performs motion estimation on pixels within the reference contour in the reference frame further modifies the reference contour based on the motion estimation and uses the modified reference contour in the comparison with the estimated contour.

32. The non-transitory computer-readable medium of claim 28, wherein an original contour of the object is obtained, and adjusting the estimated contour in the current frame further comprises:

computing a degree of agreement between the original contour and the reference contour; and adjusting the estimated contour according to the degree of similarity between the regions and the degree of agreement between the contours.

33. The non-transitory computer-readable medium of claim 32, wherein adjusting the estimated contour is performed in response to the degree of similarity between the regions being greater than a threshold, and wherein the threshold is determined according to the degree of agreement between the contours such that a lower threshold is set for a higher degree of agreement and a higher threshold is set for a lower degree of agreement.

* * * * *